(12) United States Patent
Alrabady et al.

(10) Patent No.: US 9,077,542 B2
(45) Date of Patent: Jul. 7, 2015

(54) SYSTEM AND METHOD FOR CONFIRMING THAT A USER OF AN ELECTRONIC DEVICE IS AN AUTHORIZED USER OF A VEHICLE

(75) Inventors: Ansaf I. Alrabady, Livonia, MI (US); Thomas M. P. Catsburg, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1979 days.

(21) Appl. No.: 12/236,193

(22) Filed: Sep. 23, 2008

(65) Prior Publication Data

US 2010/0073125 A1    Mar. 25, 2010

(51) Int. Cl.
*H04L 9/32* (2006.01)

(52) U.S. Cl.
CPC ........... *H04L 9/3247* (2013.01); *H04L 2209/84* (2013.01)

(58) Field of Classification Search
USPC ........ 705/64, 67, 72, 75, 76; 701/1, 2, 29, 32, 701/33, 35; 713/151, 152, 161–180, 182; 726/16–21, 34, 35; 235/382, 382.5, 235/383; 340/5.1, 5.2, 5.21–5.74, 5.8, 5.85, 340/425.5, 426.1, 426.13–426.17, 340/426.18–426.21
See application file for complete search history.

(56) References Cited

U.S. PATENT DOCUMENTS

| | | | |
|---|---|---|---|
| 7,100,200 B2 * | 8/2006 | Pope et al. | 726/10 |
| 7,116,989 B2 * | 10/2006 | Mazzara et al. | 455/456.2 |
| 7,188,110 B1 * | 3/2007 | Ludtke et al. | 382/115 |
| 7,366,892 B2 * | 4/2008 | Spaur et al. | 713/151 |
| 7,561,019 B2 * | 7/2009 | Sasakura et al. | 340/5.1 |
| 7,813,773 B2 * | 10/2010 | Yamamoto et al. | 455/575.1 |
| 2002/0138435 A1 * | 9/2002 | Williams et al. | 705/51 |
| 2003/0147534 A1 * | 8/2003 | Ablay et al. | 380/270 |
| 2005/0197174 A1 * | 9/2005 | Hasan et al. | 455/575.9 |
| 2007/0034685 A1 * | 2/2007 | Botham | 235/380 |
| 2007/0040651 A1 * | 2/2007 | Jung | 340/5.74 |
| 2007/0192436 A1 * | 8/2007 | Alrabady | 709/219 |
| 2007/0253413 A1 * | 11/2007 | Citron et al. | 370/389 |
| 2008/0148374 A1 * | 6/2008 | Spaur et al. | 726/6 |
| 2008/0155658 A1 * | 6/2008 | Leinonen et al. | 726/4 |
| 2008/0243696 A1 * | 10/2008 | LeVine | 705/53 |
| 2009/0063292 A1 * | 3/2009 | Cole et al. | 705/26 |

* cited by examiner

*Primary Examiner* — Benjamin C Lee
*Assistant Examiner* — Stephen Burgdorf
(74) *Attorney, Agent, or Firm* — Ingrassia Fisher & Lorenz, P.C.

(57) ABSTRACT

Methods and a system are provided for confirming that a user of an electronic device is an authorized user of a vehicle. The method comprises receiving a request regarding the vehicle from the electronic device in response to a user action, verifying that the user is able to cause the vehicle to perform a predetermined operation, and permitting the request to proceed only if the vehicle performs the predetermined operation.

20 Claims, 3 Drawing Sheets

SYSTEM AND METHOD FOR CONFIRMING THAT A USER OF AN ELECTRONIC DEVICE IS AN AUTHORIZED USER OF A VEHICLE

TECHNICAL FIELD

The present invention generally relates to vehicle communication systems, and more particularly relates to a system and method for confirming that a user of an electronic device is an authorized user of a vehicle.

BACKGROUND OF THE INVENTION

Increasingly vehicles are equipped with satellite, cellular, and/or other vehicular communication systems that enable the vehicle to communicate with one or more remote devices, such as a backend server that is maintained by the manufacturer of the vehicle or another trusted entity. These remote devices may communicate with the vehicular communication system to gather information regarding the vehicle (e.g., mileage, engine temperature, oil level, and other operating information) or to enable or provision certain features on the vehicle (e.g., navigation services and on-call support).

It would be desirable to allow a user of a vehicle to communicate with these remote devices to obtain information regarding the vehicle and/or to change user preferences or other features on the vehicle. One issue that arises when permitting a user to request information regarding a vehicle or to change the settings for a vehicle is authenticating the user's identity. In the absence of such authentication, a malicious individual could pose as a valid user of a vehicle to obtain information regarding a vehicle that they do not own, or to take other undesirable actions.

Accordingly, it is desirable to provide a system for confirming that a user of an electronic device is an authorized user of a vehicle. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, a method is provided for confirming that a user of an electronic device is also an authorized user of a vehicle. The method suitably comprises receiving a request regarding the vehicle from the electronic device in response to a user action, verifying that the user is able to cause the vehicle to perform an operation, and permitting the request to proceed only if the vehicle performs the operation.

In other embodiments, a system is provided for confirming that a user of an electronic device is also an authorized user of a vehicle. The system suitably comprises a network interface for communicating over an electronic network and a processor coupled to the network interface. The processor is configured to receive a request regarding the vehicle from an electronic device in response to a user action, verify that the user is able to cause the vehicle to perform an operation, and permit the request to proceed only if the vehicle performs the operation.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. It should also be understood that FIGS. 1-4 are merely illustrative and, particularly with respect to FIG. 1, may not be drawn to scale.

Various embodiments enable a manufacturer or trusted entity to confirm that a user of an electronic device, such as a personal computer (e.g. laptop or desktop), a cell phone, or a personal digital assistant (PDA), is also an authorized user of a vehicle (e.g., that the user of the electronic device also has access to, and control of, the vehicle). As further discussed below, the manufacturer or trusted entity receives a request from the user, via the electronic device, to perform an action with respect to the vehicle. The request may be to register a vehicle identification number (VIN) with a unique identifier for the user (e.g., a UserID), to obtain information regarding the vehicle (e.g., mileage or operation information), or to enable or provision certain configurable options on the vehicle (e.g., navigation services or on-call support).

Before fulfilling the request, the manufacturer or trusted entity directs the user to cause the vehicle to perform one or more operations to confirm that he or she has access to, and control of, the vehicle. After the manufacturer or trusted entity receives confirmation that the vehicle has performed the required operations, the request is fulfilled. For example, if the user requests to register the VIN for the vehicle with a UserID, the manufacturer or trusted entity associates the VIN with the UserID in a database so that the user need only provide the UserID in order to make future requests with regard to the vehicle.

Figure 1:
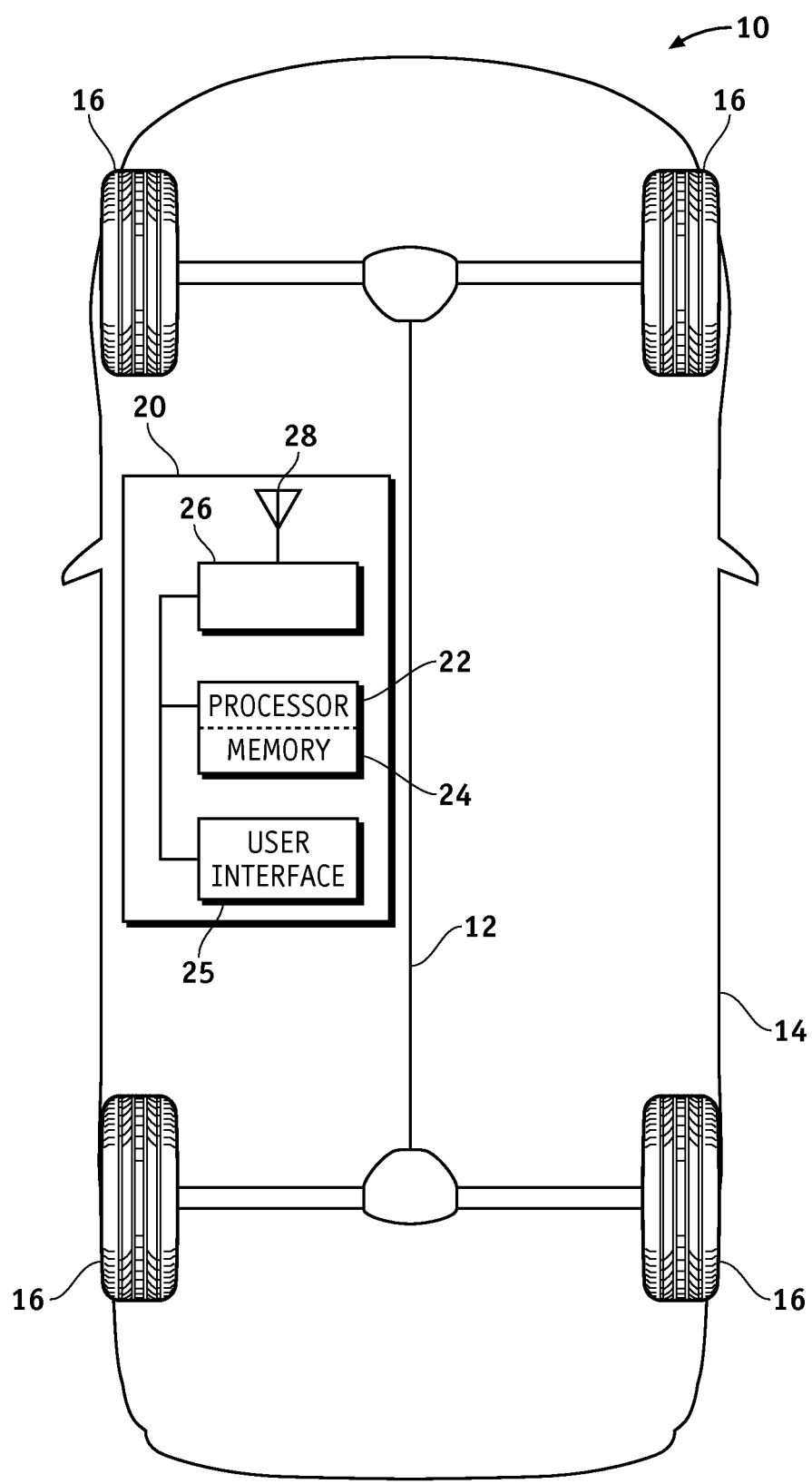
FIG. 1 depicts an exemplary vehicle configured for use with embodiments of the present invention.

FIG. 1 is a depiction of an exemplary vehicle 10 for use with exemplary embodiments. The vehicle 10 includes a chassis 12, a body 14, a plurality of wheels 16 (e.g., four as shown), and a vehicle communication system (VCS) 20. The body 14 is arranged on the chassis 12 and substantially encloses the other components of the vehicle 10. The body 14 and the chassis 12 may jointly form a frame. The wheels 16 are each rotationally coupled to the chassis 12 near a respective corner of the body 14.

The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

In the illustrated embodiment, the VCS 20 includes a processor 22, memory 24, a user interface 25, and a wireless transceiver 26. The processor 22 may be a programmable logic control system (PLC), a microprocessor, or any other type of electronic controller. It may include one or more components of a digital and/or analog type and may be programmable by software and/or firmware. The memory 24 is typically an electronic memory (e.g., ROM, RAM, or another form of electronic memory) that stores instructions and/or data in any format, including source or object code. It should be noted that processor 22 and memory 24 may be shared components that are used by other vehicle systems.

In a first embodiment, memory 24 stores a cryptographic credential for the vehicle 10 (e.g., a "vehicle credential"). The vehicle credential may be a shared key, a private key that mathematically corresponds to a public key, or a digital certificate. The vehicle credential may be stored in memory 24 during the production process of the vehicle 10. As further described below, processor 22 utilizes a cryptographic technique and the vehicle credential to generate a digital signature. This digital signature is authenticated by the manufacturer, or another trusted entity, to confirm that the user has access to, and control of, the vehicle 10. In a second embodiment, processor 22 transmits a message to the manufacturer, or another trusted entity, in response to a request from the user. The remote device verifies that the user has access to and control of the vehicle based on the message.

The user interface 25 enables the user to retrieve data from the VCS 20, and to provide data to the VCS 20. The data may include a credential value (e.g., a random number), a digital signature, personal information regarding the user, and/or other information as further described below. The user interface 25 may include a keypad or other suitable user input device and an electronic display. In one embodiment, the user interface 25 includes a microphone and the processor 22 executes voice recognition software allowing the user to speak commands into the user interface 25. Alternatively, the user interface 25 may include a port or external drive that permits the user to insert a portable memory device, such as a portable USB flash drive or other flash memory device. Processor 22 imports data that is stored on the portable memory device or exports data onto the portable memory device.

Figure 2:
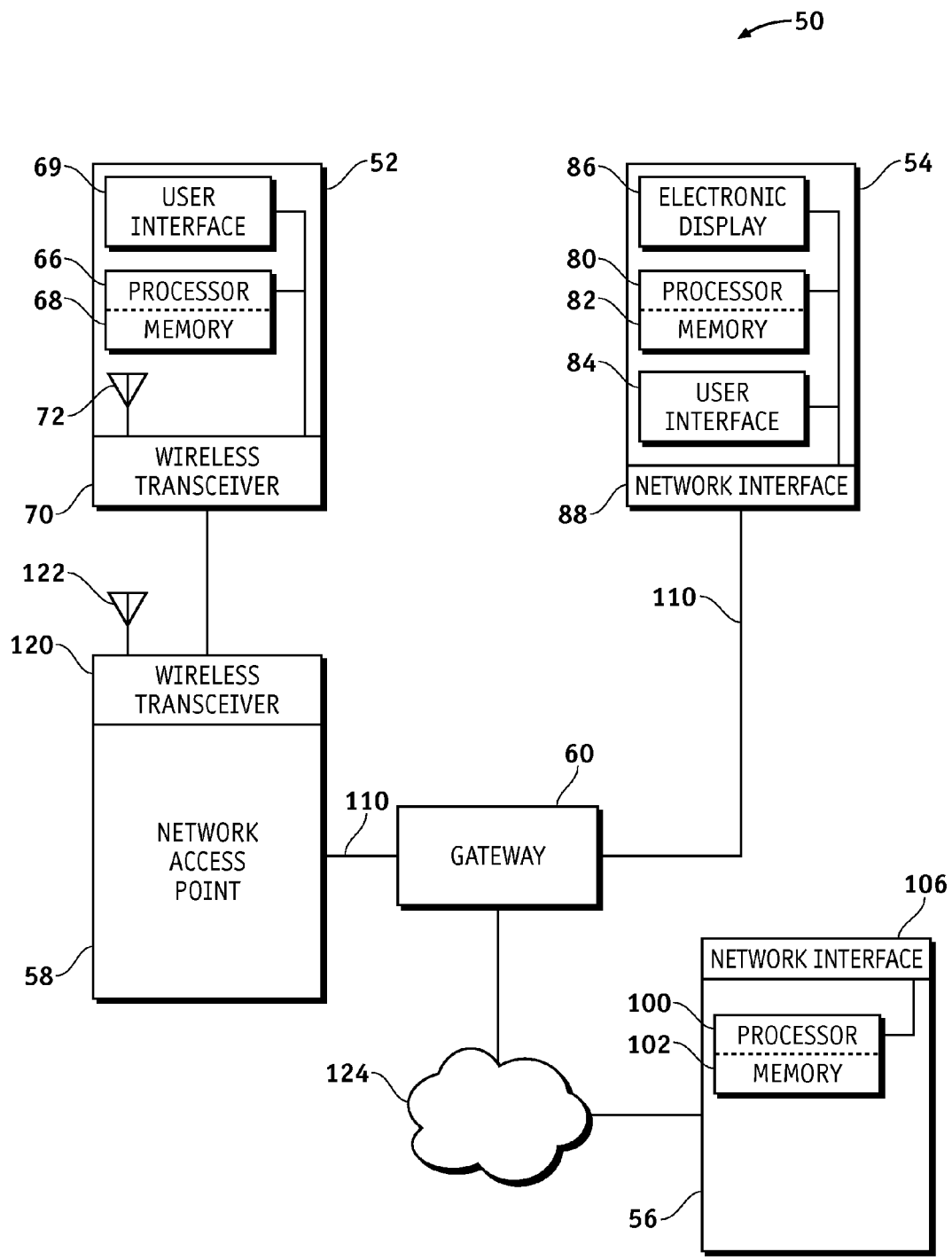
FIG. 2 is a block diagram of a system for confirming that a user of an electronic device is an authorized user of a vehicle.

The wireless transceiver 26 is coupled to a wireless antenna 28 and enables wireless communications between the VCS 20 and an electronic network via a wireless network access point (FIG. 2). For example, in one embodiment the wireless transceiver 26 includes a short range wireless communication device that communicates with a wide area network (e.g., the internet, or local wireless network) via a network access point.

FIG. 2 is a block diagram of an exemplary system 50 for confirming that a user of an electronic device has access to, and control of, a vehicle (e.g., the vehicle 10 of FIG. 1). The system 50 includes a VCS 52, an electronic device 54, a remote device 56, a network access point 58, and a gateway 60.

The VCS 52 is coupled to a vehicle (e.g., the vehicle 10 of FIG. 1) and may be the same apparatus as VCS 20 of FIG. 1. As further described below, the VCS 52 communicates with the remote device 56, and/or one or more other devices that communicate with the remote device 56. Communications between the VCS 52 and the remote device 56 may be secured using one or more cryptographic techniques, including symmetric and/or asymmetric encryption techniques involving shared keys, public/private key pairs, and/or digital certificates. The VCS 52 includes a processor 66, memory 68, an user interface 69, a wireless transceiver 70, and an antenna 72.

The electronic device 54 communicates with the remote device 56 in response to commands from a user. Communication between the electronic device 54 and the remote device 56 may be secured using a secure communication protocol (e.g., TLS). As depicted, the electronic device 54 includes a processor 80, memory 82, a user interface 84, an electronic display 86, and a network interface 88. The processor 80 may be a microprocessor or other suitable processing unit. The memory 82 may be electronic memory (e.g., ROM, RAM, or another type of electronic memory) that stores instructions and/or data for the processor 80. The processor 82 transmits requests and additional messages regarding the vehicle to the remote device 56 as commanded by the user.

The user interface 84 enables the user to provide input to the electronic device 54. In one embodiment, the user interface 84 includes one or more user input devices (e.g., a keyboard and a mouse). In addition, the user interface 84 may include other input devices such as a port or external drive where a portable memory device such as a USB flash drive may be inserted. The electronic display 86 displays images to the user in response to signals from the processor 80. The network interface 88 enables the electronic device 54 to communicate with the other devices.

The electronic device 54 may be a personal computer (e.g., a desktop or a laptop) that presents a web site that the user interacts with to communicate with the remote device 56. However, it should be noted that the electronic device 54 may include other devices (e.g., a portable electronic device or a cell phone) that are suitable for interacting with a remote device 56 via a web interface.

The remote device 56 is any sort of backend security server or the like and is maintained and controlled by the manufacturer of the vehicle, or another trusted entity. As depicted, the remote device includes a processor 100, memory 102, and a network interface 106. The processor 100 may be a microprocessor or any suitable processing unit that is capable of performing the functions described below. The memory 102 may be electronic memory (e.g., ROM, RAM, or another type of electronic memory) that stores instructions and/or data for the processor 100. As further described below, the processor 100 receives requests regarding the vehicle from electronic device 54 at the direction of the user. In response to these requests, processor 100 directs the user to cause the vehicle to perform certain actions to confirm that he or she is also an authorized user of the vehicle (e.g., that the user has access to, and control of, the vehicle). The network interface 106 enables the remote device 56 to communicate with the other devices.

In one embodiment, the processor 100 executes instructions that enable the remote device 56 to operate as a web server. In this embodiment, processor 100 provides one or more encoded messages (e.g., web pages, emails, or instant messages) to a computer system associated with the user (e.g., the electronic device 54). In addition, the processor 100 receives information from the electronic device 54 that is generated by the user as he or she interacts with the web pages. As further described below, these messages may be used to present or collect information from the user of the electronic device 54.

Processor 100 may also execute instructions that enable the remote device 56 to operate as a presence server. In this embodiment, the processor 100 receives vehicle presence messages from the VCS 52. These vehicle presence messages include a network address associated with the VCS 52. In some embodiments, the VCS 52 registers its presence with the presence server before sending a vehicle presence message.

In addition, processor 100 may access a vehicle credential database that stores a cryptographic credential (e.g., shared key, public key, and/or digital certificate) that corresponds to the vehicle credential described above. For example, the vehicle credential data base may store a public key that mathematically corresponds to a private key that is stored in memory 68 on VCS 52. The vehicle credential database also associates descriptive data (e.g., the VIN) for the vehicle with the cryptographic credential.

Although the remote device 56 is shown as a single device, it should be noted that in other embodiments performance of the functionalities associated with the remote device 56, as described herein, may be distributed across multiple devices. Further, the web server and presence server functionalities may also be implemented on separate devices.

The network access point 58 provides the VCS 52 with connectivity to a subnetwork 110. It includes a wireless transceiver 120 and a wireless antenna 122. The network access point 58 may utilize one or more security techniques (e.g., WLP, WPA, or WPA2) to secure communications with the VCS 52. These security techniques may direct the VCS 52 to exchange a secure encoding key (e.g., a pre-shared key (PSK) or password) with the network access point 58 before communications may take place. In some cases, the network address for the VCS 52 will be the same as the network address for the wireless access point. However, the VCS 52 may also have its own network address.

The gateway 60 provides connectivity between devices on the subnetwork 110 and devices on a wide area network 124 such as the Internet. For example, in one embodiment the gateway 60 is a router that provides connectivity between the electronic device 54 and the network access point 58 operating on a local area network (LAN) and the remote device 56 over the Internet. In some embodiments, the network access point 58 may be integrally formed with the gateway 60. It should be noted that because the electronic device 54 and the VCS 52 (via the network access point 58) each access the wide area network 124 via the gateway 60, the network addresses for these devices will correspond to subnetwork 110.

Figure 3:
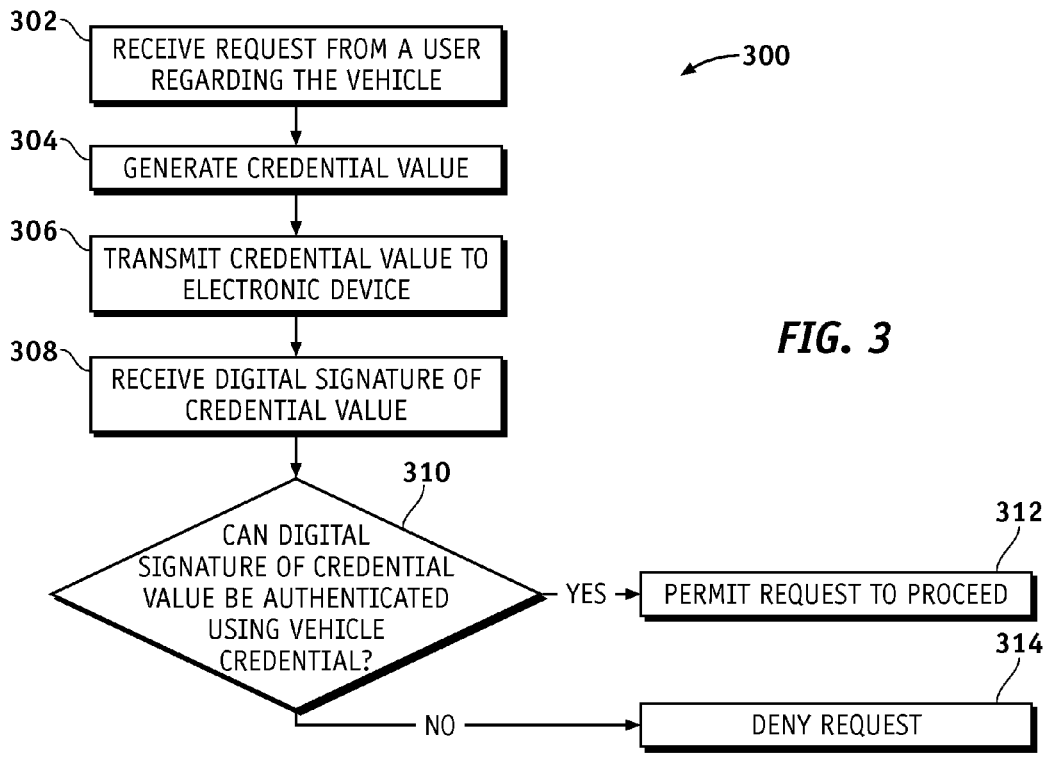
FIG. 3 is a flowchart of a method for confirming that a user of an electronic device is an authorized user of a vehicle according to a first embodiment.

FIG. 3 is a flowchart of an exemplary method 300 for confirming that a user of an electronic device is also an authorized user of a vehicle (e.g., the vehicle 10 of FIG. 1) according to a first embodiment. With reference to FIGS. 2 and 3 and as more fully described below, during method 300 the remote device 56 receives a request regarding the vehicle from the user of the electronic device 54 (step 302). In response to this request, processor 100 generates a credential value (step 304), and transmits the credential value to the electronic device 54 (step 306). The user demonstrates that he or she has access to, and control of, the vehicle by causing the vehicle to generate a digital signature of the credential value. The digital signature of the credential value is then transmitted to the remote device 56 during step 308. Next, processor 100 attempts to authenticate the digital of the credential value (step 310). If the digital signature is authenticated, processor 100 permits the request to proceed (step 312). Conversely, if the digital signature is not authenticated, processor 100 denies the request (step 314).

During step 302, the remote device 56 receives a request regarding the vehicle from the user of the electronic device 54. As described above, in one embodiment a user generates the request by interacting with a web site that is presented on the electronic device 54. For example, the user may navigate to the appropriate web site and click on a link indicating that he or she wants to register a UserID for the vehicle. As part of this request, the user may be required to provide additional information to the remote device 56, including the VIN for the vehicle and the desired UserID.

Next, processor 100 generates a credential value during step 304. The credential value may be a random number or any other value that can be digitally signed as further described below. In the case where the vehicle credential (e.g., the vehicle credential that is stored in memory 68 on the VCS 52 as described above) is a private key that mathematically corresponds to a public key, the credential value should be of sufficient length to make it difficult for a party that knows the public key, the credential value, and a digital signature of the credential value, to determine the private key using some form of a brute force attack. It should be noted that in some embodiments, the credential value may be generated beforehand and stored in a list in memory 102. In this case, processor 100 retrieves the appropriate credential value from this list during step 304.

During step 306, processor 100 transmits the credential value to the electronic device 54. The user then retrieves the credential value from the electronic device 54. In one embodiment processor 80 for the electronic device 54 displays the credential value on the electronic display 86 and the user manually records it. Alternatively, the user may insert a portable memory device (e.g., a USB flash drive or other portable storage medium) into a port or external drive on the electronic device 54 and instruct the processor 80 to export the credential value to the portable memory device.

After the user retrieves the credential value from the electronic device 54, the user confirms that he or she has access to, and control of, the vehicle by causing the vehicle to generate a digital signature of the credential value using the vehicle credential that is stored in memory 68 on the VCS 52. In one embodiment the user manually enters the credential value into the VCS 52 via the user interface 69. For example, the user may type the credential value into a keypad or speak the credential value into a microphone on the user interface 69. In another embodiment, the user inserts a portable memory device (e.g., a USB flash drive or other portable storage device) with the credential value stored thereon into a port or external drive on the user interface 69 of the VCS 52. The user then issues a command (e.g., by pressing a button on the user interface, a separate console on the vehicle, or on a wireless key FOB) directing processor 66 to sign the credential value with the vehicle credential. For example, where the vehicle credential is a private key, processor 66 generates a digital signature of the credential value using the private key.

During step 308, the remote device 56 receives the digital signature of the credential value. In one embodiment, the user retrieves the digital signature from the vehicle, inputs the digital signature into the electronic device 54, and causes the electronic device 54 to transmit the digital signature to the remote device 56. For example, the VCS 52 may display the digital signature of the credential value to the user via an electronic display on the user interface 69, enabling the user to manually record it. The user then manually inputs the digital signature into the electronic device 54 via the user interface 84. Alternatively, the user may issue a command to the VCS 52 (e.g., by pressing a button on the user interface 69, a separate console on the vehicle, or on a wireless key FOB) causing processor 66 to store the digital signature on a portable memory device (e.g., a USB flash drive or other portable storage medium) that is inserted into a port or external drive on the user interface 69 of the VCS 52. The user then removes the portable memory device from the VCS 52, inserts it into a port or external drive on the user interface 84 for the electronic device 54, and directs the electronic device 54 to retrieve the digital signature from the portable memory device and transmit it to the remote device 56.

In an alternative embodiment, the VCS 52 communicates with the remote device 56, via the network access point 58 and the gateway 60, as described above. In this case, the user issues a command (e.g., by pressing a button on the user interface 69, a separate console on the vehicle, or on a wireless key FOB) directing the VCS 52 to transmit the digital signature of the credential value directly to the remote device 56. The VCS 52 establishes a secure connection with the remote device 56 and the digital signature is transmitted using a predetermined protocol (e.g., SOAP, IM, XML, ebXML). It should be noted that if the user did not provide the VIN for the vehicle in the request during step 302, the user may provide the VIN to the remote device 56 during step 306.

Next, processor 100 attempts to verify that the digital signature of the credential value was generated using the appropriate vehicle credential (e.g., the vehicle credential that is stored in memory 68 on the VCS 52) during step 310. To accomplish this, processor 100 retrieves the cryptographic credential that corresponds to the VIN from the vehicle credential database. Processor 100 then attempts to authenticate the digital signature with that cryptographic credential. For example, in the case where the vehicle credential is a private key, processor 100 retrieves the public key for the VIN from the vehicle credential database. Processor 100 then uses the public key to authenticate that the digital signature was generated using the appropriate private key.

If processor 100 is able to authenticate the digital signature (step 312), then it permits the request of step 302 to proceed. In this case, the user has confirmed that he or she has access to the vehicle by providing a digital signature that was signed by the vehicle's private key. For example, where the request was to register the vehicle, processor 100 associates the VIN for the vehicle with the UserId for the user in memory 102 or on a database that is maintained for that purpose.

On the other hand, if the processor 100 is not able to authenticate the digital signature (step 314), then the user has not confirmed that he or she has access to, and control of, the vehicle. In this case, processor 100 denies the request.

Figure 4:
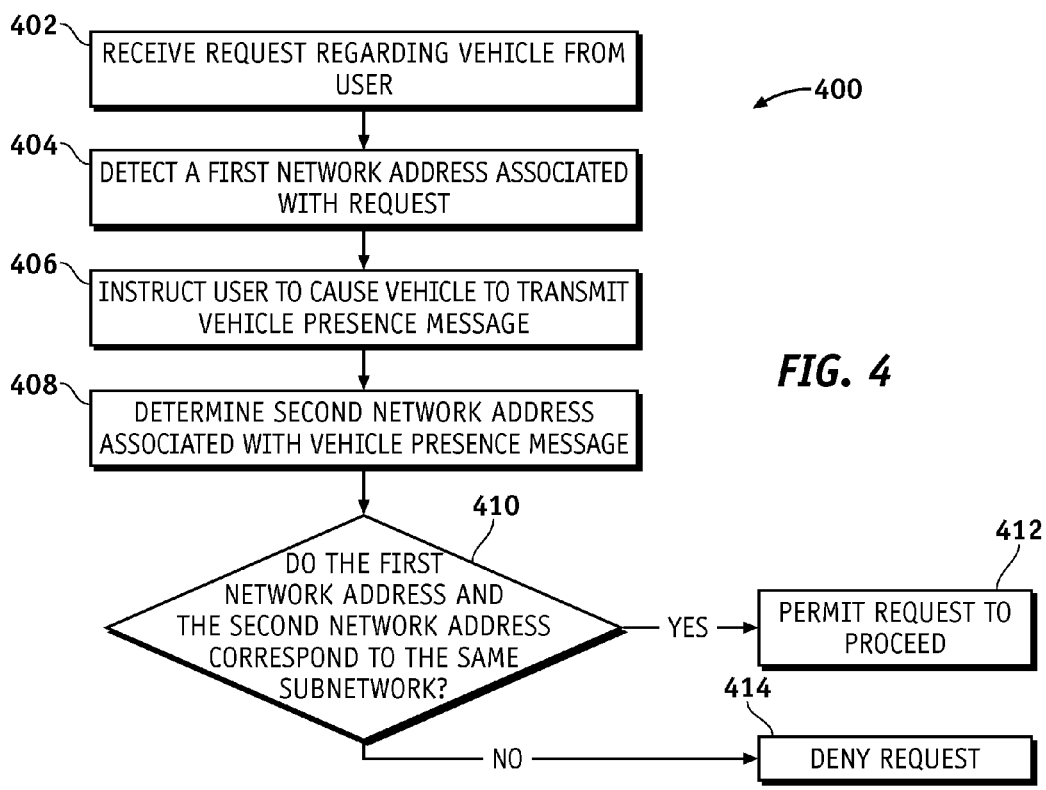
FIG. 4 is a flowchart of a method for confirming that a user of an electronic device is an authorized user of a vehicle according to a second embodiment.

FIG. 4 is a flowchart of a method 400 for confirming that a user of an electronic device is an authorized user of a vehicle (e.g., the vehicle 10 of FIG. 1) according to a second embodiment of the present invention. With reference to FIGS. 2 and 4 and as more fully described below, method 400 begins during step 402 when the remote device 56 receives a request regarding the vehicle from the user of the electronic device 54. The processor 100 determines a first network address that corresponds to the request (step 404). Next, during step 406 the processor 100 transmits a message to electronic device 54 instructing the user to cause the vehicle to transmit a vehicle presence message to a presence server (e.g., the remote device 56 or a device that communicates with the first remote device). The processor 100 for the remote device determines a second network address associated with the vehicle presence message during step 408. Next, processor 100 determines if the first network address and the second network address both correspond to the same subnetwork (e.g., subnetwork 110) during step 410. If processor 100 determines that the first network address and the second network address correspond to the same network, it permits the request to proceed (step 412). Otherwise, the request is denied (step 414).

During step 402 the remote device 56 receives a request from a user of the electronic device 54. Step 402 of method 400 is substantially similar to step 302 of method 300. The request should include a first network address for the electronic device 54. In one embodiment, the request is transmitted from the electronic device 54 to the remote device 56 using a network protocol such as the Internet Protocol (IP) that requires the sender's message to include its network address as part of the communication.

During step 404, processor 100 analyzes the request to detect the first network address. For example, if the electronic device 54 sent the request using IP or another protocol that requires the sender of a message to insert its network address, processor 100 parses the transmissions from the electronic device 54 to extract the first network address.

During step 406, processor 100 transmits a message to the user of the electronic device 54 instructing the user to cause the vehicle to transmit a vehicle presence message to the presence server (e.g., a presence server that is running on the remote device 56 or a device that is in communication with the remote device 56). The user of the vehicle then confirms that he or she has access to, and control of, the vehicle by providing an input to the vehicle that causes the VCS 52 to transmit the vehicle presence message to the presence server. The user may press a button on the user interface for the VCS 52, a separate console on the vehicle, or on a wireless key FOB for the vehicle to generate the vehicle presence message. In some embodiments, the VCS 52 must be registered with the presence server beforehand. The vehicle presence message will include a second network address associated with the VCS 52. As described above, the second network address may correspond to the VCS 52 itself, or to a network access point 58.

The remote device 56 receives the vehicle presence message (or a message that includes the second network address from a separate device that received the vehicle presence message) and the processor 100 extracts the second network address (step 408). During step 410, processor 100 determines if the first network address and the second network address correspond to the same subnetwork. Processor 100 analyzes the portion of the first network address and the second network address that identify a subnetwork to which they correspond (e.g., by applying a subnet mask to both addresses). In the depicted embodiment, the first network address (e.g., corresponding to the electronic device 54) and the second network address (e.g., corresponding to the VCS 52 or network access point 58) each correspond to subnetwork 110 because both were sent by devices that communicate over subnetwork 110 and access the wide area network 124 via the same gateway 60.

If processor 100 determines that the first network address and the second network address both correspond to the same subnetwork, then it permits the request to proceed (step 412). In this case, the user has confirmed that he or she has access to, and control of, the vehicle by causing the vehicle to generate a vehicle presence message that was transmitted from the same subnetwork as, and presumably a location near, the electronic device 54. On the other hand, if processor 100 detects that the first network address does not correspond to the second network address, the request is denied.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for confirming that a user of an electronic device is also an authorized user of a vehicle, the method comprising:
   receiving a request regarding the vehicle from the user from the electronic device in response to a user action;
   verifying that the user is able to cause the vehicle to perform an operation; and
   permitting the request to proceed only if the vehicle performs the operation.

2. The method of claim 1, wherein the step of receiving further comprises receiving a request to register the vehicle.

3. The method of claim 2, wherein the step of permitting further comprises associating a first unique identifier that corresponds to the vehicle with a second unique identifier that corresponds to the user.

4. The method of claim 1, wherein the vehicle has a cryptographic credential and the step of verifying further comprises:
   transmitting a random value to the user in response to the request;
   receiving a digital signature of the random value; and
   authenticating that the digital signature was generated using the cryptographic credential for the vehicle.

5. The method of claim 4, further comprising:
   causing the vehicle to generate the digital signature for the user; and
   transmitting the digital signature to a remote device for authentication.

6. The method of claim 4, wherein the digital signature of the random value is received from the electronic device.

7. The method of claim 4, wherein the vehicle comprises a vehicular communication system and the step of receiving the digital signature of the random value further comprises receiving the digital signature of the random value from the vehicular communication system.

8. The method of claim 1, wherein the vehicle comprises a vehicular communication system and the step of verifying further comprises:
   detecting a first network address corresponding to the request;
   detecting a second network address that corresponds to a message transmitted by the vehicular communication system; and
   verifying that the first network address and the second network address correspond to a same subnetwork.

9. A system for confirming that a user of an electronic device is also an authorized user of a vehicle, the system comprising:
   a network interface for communicating over an electronic network;
   a processor coupled to the network interface and configured to:
      receive a request regarding the vehicle from the electronic device in response to a user action;
      verify that the user is able to cause the vehicle to perform an operation; and
      permit the request to proceed only if the vehicle performs the operation.

10. The system of claim 9, wherein the request comprises a request by the user to register a first unique identifier that corresponds with the vehicle with a second unique identifier that corresponds with the user.

11. The system of claim 9, wherein the vehicle has a private key that mathematically corresponds to a public key that is associated with the vehicle and the processor is further configured to:
   transmit a random value to the electronic device in response to the request, wherein the user retrieves the random value from the electronic device and provides it to the vehicle;
   receive a digital signature of the random value, wherein the digital signature of the random value is generated by the vehicle using the private key;
   authenticate that the digital signature of the random value was generated using the public key associated with the vehicle; and
   permit the request to continue only if the digital signature of the random value is authenticated.

12. The system of claim 11, wherein the user causes the vehicle to generate the digital signature for the user, the processor receives the digital signature, and the processor authenticates the digital signature, wherein the processor is part of a remote device that is remote from the vehicle and the user.

13. The system of claim 11, wherein the processor receives the digital signature of the random value from the electronic device.

14. The system of claim 11, wherein the vehicle comprises a vehicular communication system and the processor receives the digital signature of the random value from the vehicular communication system.

15. The system of claim 9, wherein the vehicle comprises a vehicular communication system and the processor is further configured to:
   detect a first network address corresponding to the request;
   instructing the user to direct the vehicular communication system to transmit a message to a presence server;
   detect a second network address corresponding to the message; and
   permit the request to proceed if the first network address and the second network address correspond to a same subnetwork.

16. A vehicular communication system coupled to a vehicle, the vehicular communication system comprising:
   a wireless network interface for communicating over an electronic network; and
   a processor coupled to the wireless network interface and configured to:
      receive an input from a user of the vehicle; and
      cause the vehicle to perform a predetermined operation to produce a result in response to the input from the user, and to provide the result for verification.

17. The vehicular communication system of claim 16, wherein:
   the vehicular communication system further comprises a user interface and has a private key that mathematically corresponds to a public key;
   the input comprises receiving a credential value from the user via the user interface; and
   the predetermined operation comprises generating a digital signature of the credential value via the vehicle using the private key.

18. The vehicular communication system of claim 17, wherein the predetermined operation further comprises providing the digital signature of the credential value from the vehicle to the user via the user interface.

19. The vehicular communication system of claim 17, wherein the predetermined operation further comprises transmitting the digital signature of the credential value from the vehicle to a trusted entity.

20. The vehicular communication system of claim 16, wherein the predetermined operation comprises transmitting a message to a presence server in response to the input.

* * * * *